(12) United States Patent
Hasegawa et al.

(10) Patent No.: US 7,820,478 B2
(45) Date of Patent: Oct. 26, 2010

(54) LIGHT-EMITTING DEVICE

(75) Inventors: Toshinori Hasegawa, Yokohama (JP); Koichi Suzuki, Yokohama (JP); Maki Okajima, Tachikawa (JP); Toshihide Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/581,384

(22) Filed: Oct. 19, 2009

(65) Prior Publication Data

US 2010/0041171 A1  Feb. 18, 2010

Related U.S. Application Data

(62) Division of application No. 11/236,649, filed as application No. PCT/JP2004/005556 on Apr. 19, 2004, now Pat. No. 7,750,340.

(30) Foreign Application Priority Data

Apr. 30, 2003  (JP)  ............... 2003-125447

(51) Int. Cl.
  *H01L 51/40*  (2006.01)
(52) U.S. Cl. .................. 438/99; 257/40; 257/E51.027; 546/88; 546/108
(58) Field of Classification Search .................. 257/40, 257/E51.027; 438/99; 546/88, 108
See application file for complete search history.

(56) References Cited

U.S. PATENT DOCUMENTS

| | | | |
|---|---|---|---|
| 5,739,635 A | 4/1998 | Wakimoto | 313/504 |
| 6,013,384 A | 1/2000 | Kido et al. | 428/690 |
| 2006/0097227 A1 | 5/2006 | Okajima et al. | 252/301.16 |

FOREIGN PATENT DOCUMENTS

| | | |
|---|---|---|
| EP | 1097980 | 5/2001 |
| JP | 9-17574 | 1/1997 |
| JP | 10-270172 | 10/1998 |
| JP | 2000-77191 | 3/2000 |
| JP | 2001-230072 | 8/2001 |
| JP | 2001-338768 | 12/2001 |
| WO | WO 2004-026870 A1 | 4/2004 |

OTHER PUBLICATIONS

Ito et al., "Syntheses of Phenanthroline Derivatives and Their Application to Organic EL Devices", Polymer Preprints, Japan, vol. 51, No. 11, 2859-2860 (2002).

*Primary Examiner*—Matthew E Warren
*Assistant Examiner*—Anthony Ho
(74) *Attorney, Agent, or Firm*—Fitzpatrick, Cella, Harper & Scinto

(57) ABSTRACT

To provide a light-emitting device which can emit light with high luminance and high efficiency, and is excellent in durability. The light-emitting device includes an organic compound layer containing a phenanthroline compound represented by the general formula [I] and a carbonate.

3 Claims, 3 Drawing Sheets

○ : EX.1   ▲ : COMP.EX.1   ■ : COMP.EX.2

LIGHT-EMITTING DEVICE

This application is a divisional application of U.S. application Ser. No. 11/236,649 filed Sep. 28, 2005, which, in turn, is a 371 of PCT/JP2004/005556, filed Apr. 19, 2004, which, in turn, claims priority of Japanese Patent Application No. 2003-125447, filed Apr. 30, 2003. The contents of all of the aforementioned applications are hereby incorporated by reference herein in their entireties.

TECHNICAL FIELD

The present invention relates to a light-emitting device including at least one organic compound layer between an anode and a cathode.

BACKGROUND ART

A light-emitting device is a so-called organic electroluminescence device in which an organic compound placed between a cathode and an anode emits light owing to an electric current flowing between both the electrodes.

FIG. 1 shows a general sectional structure of a light-emitting device. In the figure, reference numeral 1 denotes a transparent substrate; 2, a transparent electrode; 3, a hole transporting layer; 4, a light-emitting layer; 5, an electron transporting layer; 6, an electron injection layer; and 7, a cathode.

In the light-emitting device, recombination between an electron, which is injected from the cathode 7 into the light-emitting layer 4 through the electron transporting layer 5 and the electron injection layer 6, and a hole, which is injected from the transparent electrode 2 into the light-emitting layer 4 through the hole transporting layer 3, generates an exciton. The light-emitting device utilizes light emitted when the exciton reverts to its ground state.

Used for the cathode 7 of the light-emitting device is a material with a relatively small work function and a good electron injection characteristic, which includes an element metal such as magnesium (Mg) or a metal alloy such as Ag—Mg or Al—Li.

In addition, U.S. Pat. No. 6,013,384 discloses a structure in which an organic layer containing a metal that functions as a donor (electron donative) dopant is placed to be adjacent to a cathode. U.S. Pat. No. 6,013,384 also discloses metals each of which is used as the donor (electron donative) dopant such as alkali metals, alkali earth metals, and transition metals including rare earth.

U.S. Pat. No. 6,013,384 also discloses a structure in which an organic layer containing as a dopant a metal oxide or a metal salt is placed to be adjacent to a cathode.

An organic compound used for each of those organic layers may be, for example, bathophenanthroline, which has a good electron transporting characteristic.

The largest problem in such a light-emitting device is a service life when the device is continuously driven. In particular, the above bathophenanthroline has a glass transition temperature (Tg) as low as about 75° C. Therefore, in a light-emitting device using a material such as bathophenanthroline for its organic layer, the shape of a thin film constituting the organic layer changes owing to heat generation upon the drive of the device. The change in the shape of the thin film is a factor causing inhibition on carrier injection from an electrode, an increase in driving voltage, and generation of a non-light-emitting portion called a dark spot. For such a reason, a light-emitting device using bathophenanthroline exhibited good initial characteristics in terms of emission luminance, emission efficiency, and the like, but had a short service life upon continuous drive.

DISCLOSURE OF THE INVENTION

The present invention provides a light-emitting device with extremely high efficiency, extremely high luminance, and durability.

Specifically, the present invention provides a light-emitting device including at least a pair of electrodes consisting of an anode and a cathode and an organic compound layer placed between the pair of electrodes, in which the organic compound layer electrically contacting with the cathode includes: at least one phenanthroline compound represented by the following general formula [I]; and a carbonate.

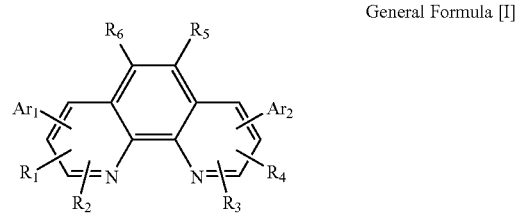

General Formula [I]

(In the formula, $R_1$, $R_2$, $R_3$, $R_4$, $R_5$, and $R_6$ each represent a hydrogen atom, an alkyl group, a substituted or unsubstituted aralkyl group, a substituted or unsubstituted aryl group, a substituted or unsubstituted heterocyclic group, or a halogen atom. $R_1$, $R_2$, $R_3$, $R_4$, $R_5$, and $R_6$ may be identical to or different from one another. $Ar_1$ and $Ar_2$ each represent a substituted or unsubstituted fluorenyl group, a substituted or unsubstituted fluoranthenyl group, a substituted or unsubstituted perylenyl group, or a substituted or unsubstituted carbazolyl group, and $Ar_1$ and $Ar_2$ may be identical to or different from each other.)

BEST MODE FOR CARRYING OUT THE INVENTION

Figure 1:
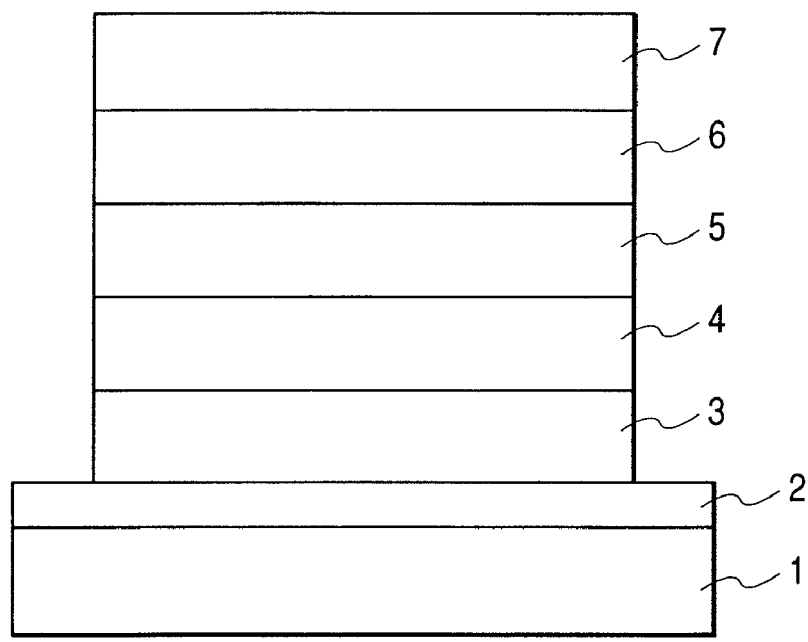
FIG. 1 is a schematic diagram showing an example of a laminated structure of a device.

The inventors of the present invention have found that a carbonate can be suitably used in a light-emitting device having a phenanthroline compound represented by the following general formula [I] in addition to bathophenanthroline described above.

According to a first aspect of the present invention, there is provided a light-emitting device including at least a pair of electrodes consisting of an anode and a cathode and an organic compound layer sandwiched between the pair of electrodes, in which the organic compound layer electrically contacting with the cathode contains: at least one phenanthroline compound represented by the following general formula [I]; and a carbonate.

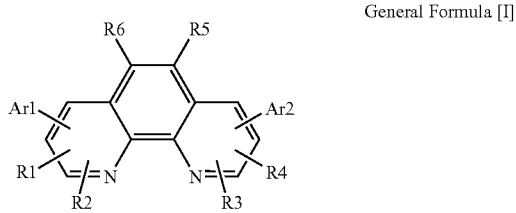

General Formula [I]

(In the formula, $R_1$, $R_2$, $R_3$, $R_4$, $R_5$, and $R_6$ each represent a hydrogen atom, an alkyl group, a substituted or unsubstituted aralkyl group, a substituted or unsubstituted aryl group, a substituted or unsubstituted heterocyclic group, or a halogen atom. $R_1$, $R_2$, $R_3$, $R_4$, $R_5$, and $R_6$ may be identical to or different from one another. $Ar_1$ and $Ar_2$ each represent a substituted or unsubstituted condensed polycyclic aromatic or condensed polyheterocyclic group. $Ar_1$ and $Ar_2$ may be identical to or different from each other.)

According to a second aspect of the present invention, there is provided a light-emitting device according to the first aspect, in which $Ar_1$ and $Ar_2$ in the general formula [I] are preferably independently selected from the group consisting of a substituted or unsubstituted fluorenyl group, a substituted or unsubstituted fluoranthenyl group, and a substituted or unsubstituted perylenyl group.

According to a third aspect of the present invention, there is provided a light-emitting device according to the first or second aspect, in which $Ar_1$ and $Ar_2$ in the general formula [I] each are preferably a fluorenyl group represented by the following general formula [II].

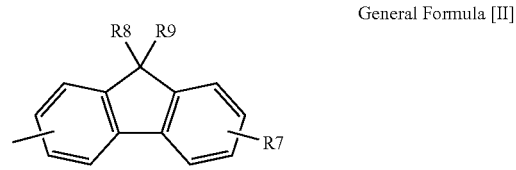

General Formula [II]

(In the formula, $R_7$ represents a hydrogen atom, an alkyl group, a substituted or unsubstituted aralkyl group, a substituted or unsubstituted aryl group, a substituted or unsubstituted heterocyclic group, a substituted amino group, a cyano group, or a halogen atom. $R_8$ and $R_9$ each represent a hydrogen atom, an alkyl group, a substituted or unsubstituted aralkyl group, a substituted or unsubstituted aryl group, or a substituted or unsubstituted heterocyclic group, and $R_8$ and $R_9$ may be identical to or different from each other.)

According to a fourth aspect of the present invention, there is provided a light-emitting device according to any one of the first to third aspects, in which the carbonate is preferably an alkali metal salt or an alkali earth metal salt.

According to a fifth aspect of the present invention, there is provided a light-emitting device according to any one of the first to fourth aspects, in which the cathode is preferably transparent to visible light.

According to a sixth aspect of the present invention, there is provided a light-emitting device according to any one of the first to fifth aspects, in which the cathode is preferably an indium tin oxide (ITO) electrode.

According to a seventh aspect of the present invention, there is provided a light-emitting device according to any one of the first to fourth aspects, in which the cathode is preferably an electrode made of at least one member selected from the group consisting of gold, silver, and aluminum.

According to an eighth aspect of the present invention, there is provided a light-emitting device according to any one of the first to sixth aspects, in which the cathode is preferably a light-pickup side electrode.

According to a ninth aspect of the present invention, there is provided a light-emitting device according to any one of the first to eighth aspects, in which the anode is preferably a light reflecting electrode.

According to a tenth aspect of the present invention, there is provided a light-emitting device according to any one of the first to ninth aspects, in which the anode is preferably an electrode containing chromium (Cr).

According to an eleventh aspect of the present invention, there is provided a light-emitting device according to any one of the first to tenth aspects, in which the anode is preferably an electrode containing silver (Ag).

According to a twelfth aspect of the present invention, there is provided a light-emitting device according to any one of the first to eleventh aspects, in which the anode is preferably a reflective electrode and the cathode is preferably a transparent electrode.

According to a thirteenth aspect of the present invention, there is provided a light-emitting device according to any one of the first to twelfth aspects, in which the anode is preferably an electrode made of chromium and the cathode is preferably an electrode made of an indium tin oxide (ITO).

According to a fourteenth aspect of the present invention, there is provided a light-emitting device according to any one of the first to thirteenth aspects, preferably further including a light-emitting layer different from the organic compound layer between the organic compound layer electrically contacting with the cathode and the anode.

According to a fifteenth aspect of the present invention, there is provided a light-emitting device according to the fourteenth aspect, preferably further including a different organic compound layer between the organic compound layer electrically contacting with the cathode and the light-emitting layer.

First Embodiment

A light-emitting device according to a first embodiment of the present invention is a light-emitting device including at least a pair of electrodes consisting of an anode and a cathode and a light-emitting layer placed between the pair of electrodes, characterized in that an organic compound layer, which is substantially in contact with the cathode, contains: at least one phenanthroline compound represented by the general formula [I]; and a carbonate.

Representative examples of the phenanthroline compound to be used in the present invention are given below. However, the present invention is not limited thereto.

Compound Example
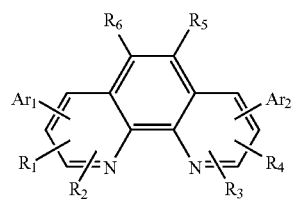
General Formula [I]
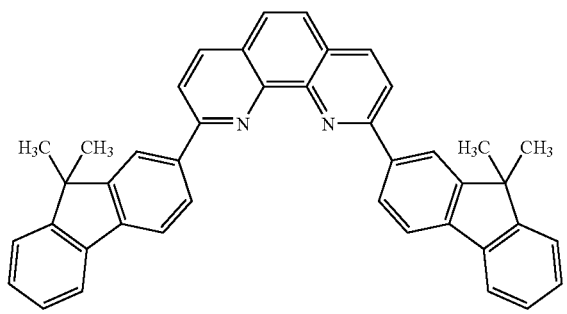
1
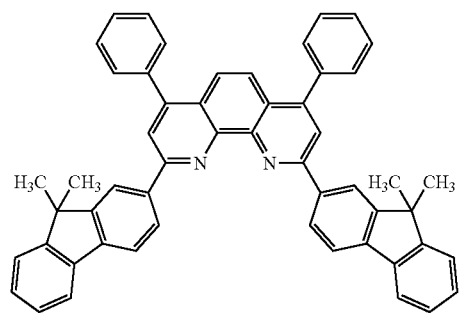
2
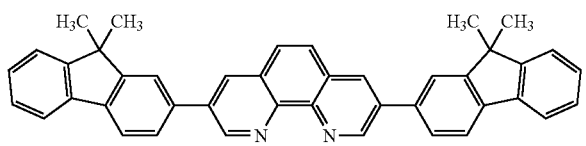
3
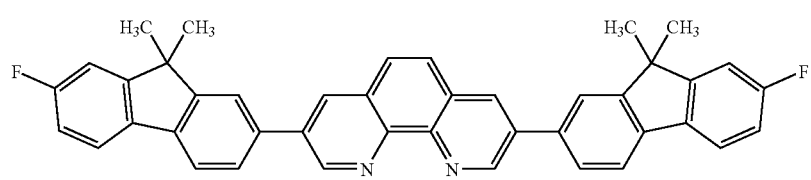
4
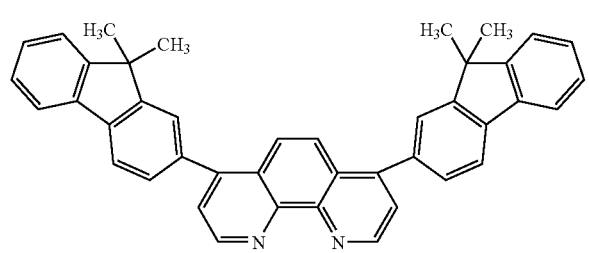
5
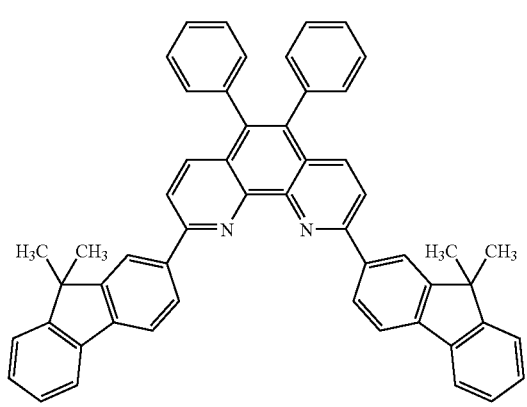
6

-continued
7
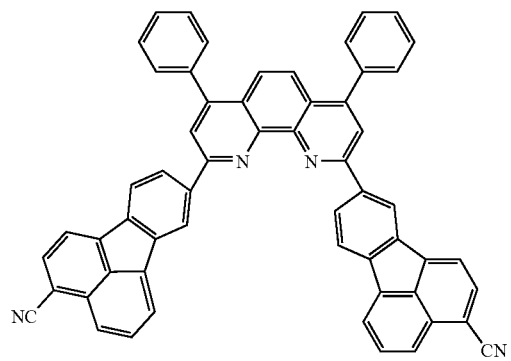
8
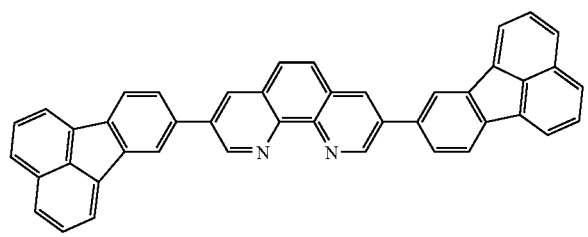
9
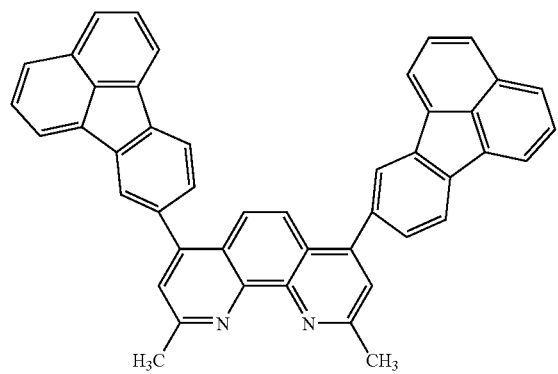
10
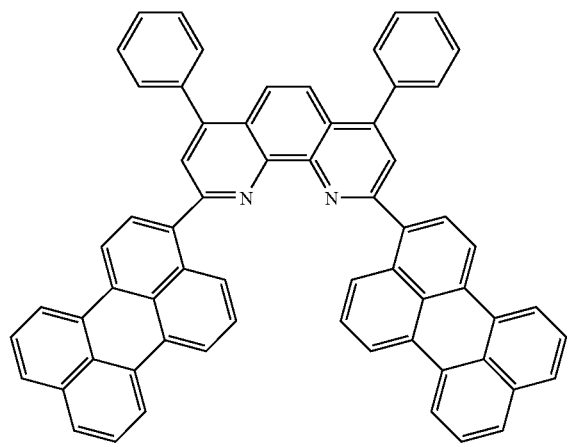
11
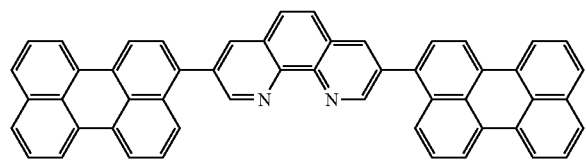
12
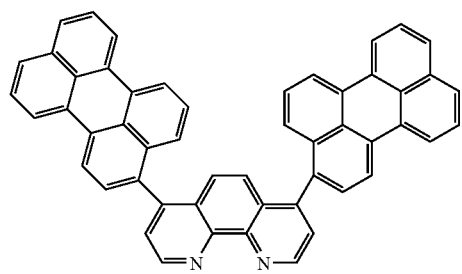
14
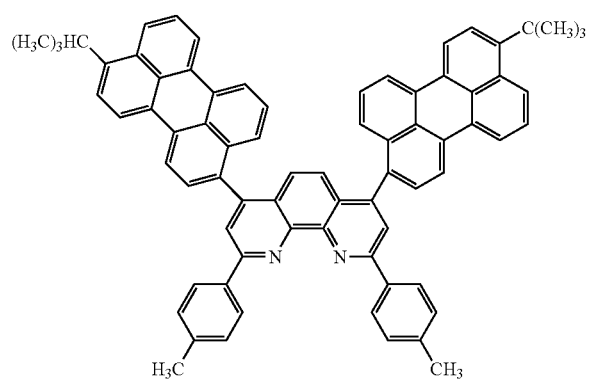
15
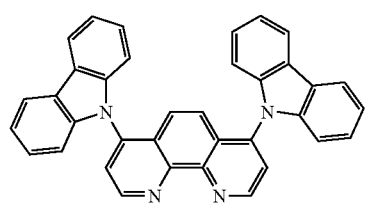

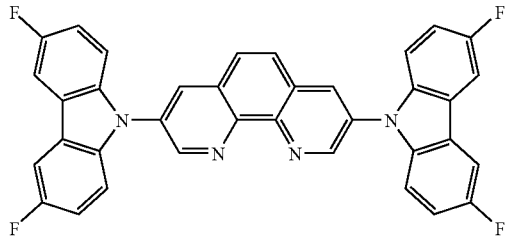
16

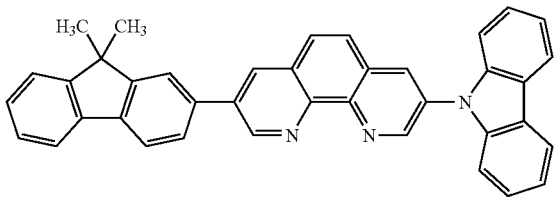
17

Those phenanthroline compounds are superior in electron transporting characteristic and durability to conventional compounds.

In addition, the organic compound layer in the light-emitting device of the present invention contains a carbonate in addition to the above phenanthroline compound. The carbonate to be used in the present invention is preferably a carbonate of an alkali metal or of an alkali earth metal. Of those, a carbonate that can be particularly preferably used is at least one of cesium carbonate ($Cs_2CO_3$) and lithium carbonate ($Li_2CO_3$). As a matter of course, a carbonate of an alkali metal and a carbonate of an alkali earth metal may coexist in the organic compound layer.

One reason why a carbonate is preferably used may be that the durability of a device to be obtained can be enhanced. The durability refers to the service life of the device. A carbonate, because of its relatively high molecular weight, may hardly move in an organic compound layer upon the drive of the device. Another reason why a carbonate is preferably used may be that the carbonate has a good affinity for an organic compound that constitutes the organic compound layer, that is, a phenanthroline compound.

The organic compound layer containing such phenanthroline compound and carbonate as described above efficiently donates an electron from the cathode to the light-emitting layer. As a result, in this embodiment, when a material to be used for the cathode is chosen, the material is not limited by its work function. In other words, a material with a relatively large work function can be used for the cathode. Specifically, even if an indium tin oxide (ITO), gold, silver, or an alloy thereof is selected, good electron injection to a light-emitting device can be realized.

In particular, in a light-emitting device in which a cathode is made of an indium tin oxide (ITO) and an organic compound layer which substantially electrically contacts with the indium tin oxide (ITO) electrode contains the phenanthroline compound and the carbonate described above, the cathode and the organic compound layer each have optically good transmittance. Therefore, light can be picked up from the cathode and hence the above light-emitting device is suitable for a so-called top emissiontype light-emitting device. As a matter of course, the light-emitting device of the present invention may be of a type in which light is picked up from an anode.

In addition, the organic compound layer containing a phenanthroline compound and a carbonate has a thickness in the range of 0.1 to 1,000 nm (The range means that the thickness is 0.1 nm or more and 1,000 nm or less. The same holds true for the description below.), preferably in the range of 1 to 500 nm. The light-emitting layer may have an arbitrary thickness. To obtain high emission efficiency, a sufficient recombining area is desirably present in the thickness direction of the light-emitting layer.

In addition, a different layer may be provided between the cathode and the organic compound layer. The different layer may be an organic layer, an inorganic layer, or a mixed layer of an organic layer and an inorganic layer. More specifically, the different layer may be an LiF layer. Provision of such a different layer further improves the electron injection. Even if the different layer is provided, the cathode and the organic compound layer substantially electrically contact with each other.

In forming an organic compound layer composed of a phenanthroline compound and a carbonate, it is preferable to carry out co-deposition of both the phenanthroline compound and the carbonate. It is particularly preferable that the organic compound layer be formed with the carbonate being heated. The formation of the organic compound layer with the carbonate being heated enables the current density of the light-emitting device to reach a practically preferable level. The carbonate such as cesium carbonate or lithium carbonate can be heated at a temperature of 150° C. or more and 700° C. or less. This temperature range is a relatively low temperature range. The temperature region (range) may be a temperature region including any one of the melting point, decomposition temperature, and decomposition starting temperature of the carbonate.

Although the reason why the carbonate is preferably heated cannot be determined at present, it may be that the heating causes the phenanthroline compound and the carbonate to interact to result in efficient electron donation from the cathode to the light-emitting layer.

Otherwise, the carbonate may reduce the phenanthroline compound when heated. Then, even when gold (Au), silver (Ag), or an indium tin oxide (ITO), each of which is a stable metal, is used, it may be possible to reduce a barrier to electron injection from the cathode and to reduce the driving voltage of the device.

In addition, as compared to an element metal (for example, a cesium element metal), a carbonate ($Cs_2CO_3$) is preferable. This is probably because the carbonate has a higher molecular weight than that of the element metal (that is, the carbonate is heavier than the element metal) and a cesium element hardly moves.

A process of forming the organic compound layer may be any thin film forming process. For instance, a deposition process and a sputtering process can be used. Those processes are preferable because carbonates can be heated in those processes.

In addition, the light-emitting device of this embodiment can be applied to a light-emitting device array having multiple light-emitting devices, to a display device such as a display (irrespective of whether the display device is a mono-color display device or a full-color display device), and to a light source used for light-exposing an electrophotographic photosensitive body (of a laser-beam printer, a copier, or the like).

Further, examples of the material to be used for the cathode in the light-emitting device of this embodiment of the present invention include aluminum (Al), silver (Ag), gold (Au), an indium tin oxide (ITO), and an alloy containing at least one of them. The examples further include magnesium (Mg), platinum (Pt), palladium (Pd), selenium (Se), iridium (Ir), tin oxide, copper iodide, and a mixed metal (such as an alloy) containing at least one of them.

In the light-emitting device of this embodiment of the present invention, the order in which the cathode and the organic compound layer in contact with the cathode are formed is not limited, and the order can be freely selected.

Second Embodiment

Figure 2:
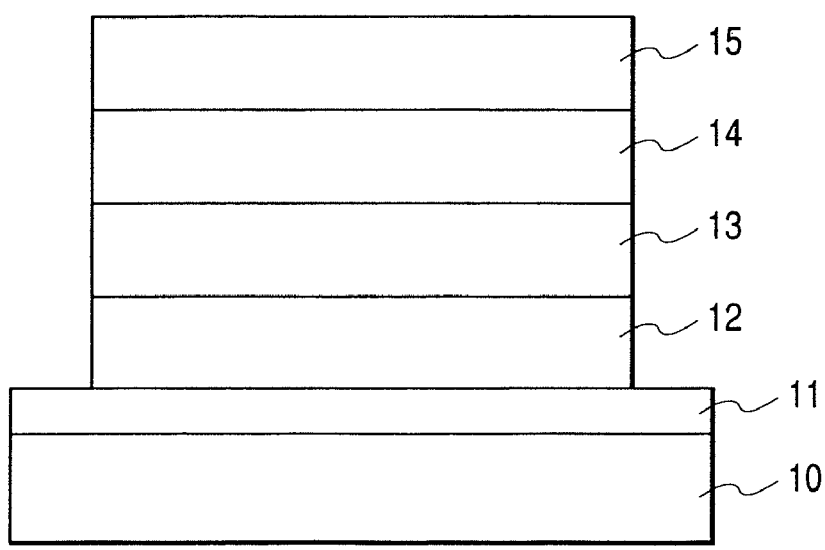
FIG. 2 is a schematic diagram showing an example of a laminated structure of a light-emitting device according to the present invention.

FIG. 2 is a schematic diagram showing a second embodiment of the present invention. In the description of this embodiment, part of the light-emitting device of the first embodiment is extended to a layer structure including an anode. In the figure, the light-emitting device of the present invention is constituted by laminating, on a substrate 10, an electrode 11 to serve as an anode, a hole transporting layer 12 having a hole transporting characteristic, a light-emitting layer 13, an organic compound layer 14 composed of a phenanthroline compound and a carbonate, and an electrode 15 to serve as a cathode.

In addition to the above structure, examples of the structure of the organic compound layer include: an electrode (anode)/a light-emitting layer/an organic compound layer/an electrode (cathode); an electrode (anode)/a hole transporting layer/a light-emitting layer/an electron transporting layer/an organic compound layer/an electrode (cathode); an electrode (anode)/a hole injection layer/a light-emitting layer/an organic compound layer/an electrode (cathode); an electrode (anode)/a hole injection layer/a hole transporting layer/a light-emitting layer/an organic compound layer/an electrode (cathode); and an electrode (anode)/a hole injection layer/a hole transporting layer/a light-emitting layer/an electron transporting layer/an organic compound layer/an electrode (cathode). The light-emitting device of the present invention may adopt any device structure as long as the organic compound layer 14 is provided at the interface with the cathode 15. Furthermore, specifically, the layer structure is desirably such that the cathode, the organic compound layer, and the electron transporting layer are formed in this order (as a matter of course, the order in which the respective layers are formed may be such that the electron transporting layer, the organic compound layer, and the cathode are formed in this order). In particular, in the case of this layer structure, a phenanthroline compound to be incorporated in the organic compound layer of the present invention can be preferably used as the electron transporting layer. In addition, at least one of: a metal complex compound such as Alq3 or PBO; a heterocyclic compound such as oxazole, triazole, quinoxaline, triazine, triazole, or silole; and a heterocondensed cyclic compound may be used as the electron transporting layer.

Additional provision of such an electron transporting layer further improves the efficiency of electron donation from the cathode to the light-emitting layer. In this case, a material for the electron transporting layer and an organic compound that mainly constitutes the organic compound layer may be different compounds, but are preferably the same compound.

An organic compound that can be used for the hole transporting layer 12 and a hole injection layer is not particularly limited. Examples of such an organic compound include a triphenyl diamine derivative, an oxadiazole derivative, a polyphilyl derivative, and a stilbene derivative. However, the organic compound is not limited thereto.

Examples of an adoptable organic compound which can be used as a material for the light-emitting layer 13 include a triarylamine derivative; a stilbene derivative, polyarylene, an aromatic condensed polycyclic compound, an aromatic heterocyclic compound, an aromatic heterocondensed cyclic compound, a metal complex compound, and a homo-oligomer or co-oligomer thereof. Furthermore, the hole injection layer, the hole transporting layer, or the electron transporting layer may be doped with one or more of those light-emitting materials. The materials and compositions are not limited thereto.

The electrode 11 to serve as an anode preferably has a large work function. For example, an indium tin oxide (ITO), tin oxide, gold (Au), platinum (Pt), chromium (Cr), palladium (Pd), selenium (Se), iridium (Ir), copper iodide, or an alloy can be used for the electrode.

A process of forming the hole injection layer, the hole transporting layer 12, the light-emitting layer 13, and the electron transporting layer described above may be any thin film forming process. For instance, a deposition process, sputtering process, CVD process, molecular beam epitaxy process (MBE process), dipping process, spin coating process, casting process, bar coating process, roll coating process, ink jet process, and the like can be used.

In addition, in the light-emitting device described in each embodiment of the present invention, it is also possible to provide a protective layer made of an organic or inorganic material to protect the device from oxygen and moisture. Provision of such a protective layer does not inhibit the characteristics of the present invention at all. In addition, the environmental resistance of the device can be improved by, for example, sealing the device in inert gas.

Third Embodiment

A light-emitting device according to a third embodiment of the present invention is the same as that of the second embodiment except that a different layer is provided between the organic compound layer and the light-emitting layer. The category of this embodiment includes layer structures such as: an electrode (anode)/a hole transporting layer/a light-emitting layer/an electron transporting layer/an organic compound layer/an electrode (cathode); and an electrode (anode)/a hole injection layer/a hole transporting layer/a light-emitting layer/an electron transporting layer/an organic compound layer/an electrode (cathode) out of the layer structures described in the second embodiment. However, a block layer, more specifically a layer having a function as a hole blocking layer, may be provided between the light-emitting layer and the organic compound layer. The hole blocking layer may be the same as the electron transporting layer described above or may be provided separately.

By using the hole blocking layer, electrons, holes, and excitons are efficiently trapped in the light-emitting layer of the device, and the emission efficiency of the device increases.

If a layer composed of a phenanthroline compound to be incorporated in the organic compound layer of the present invention is formed between the light-emitting layer and the organic compound layer, the layer composed of a phenanthroline compound can be suitably used not only as the hole blocking layer but also as the electron transporting layer. A light-emitting device thus obtained can provide good emission efficiency.

Furthermore, an organic compound different from the organic compound that constitutes the organic compound layer may be used as the hole blocking layer. In this case, at least one of: a metal complex compound such as Alq3 or PBO; a heterocyclic compound such as oxazole, triazole, quinoxaline, triazine, triazole, or silole; and a heterocondensed cyclic compound may be used as the hole blocking layer.

Fourth Embodiment

A light-emitting device according to a fourth embodiment of the present invention is a so-called top emissiontype light-emitting device in which light is picked up from an electrode arranged on the side opposite to a substrate.

This embodiment is the same as any one of the first, second, and third embodiments of the present invention except that a lower surface electrode arranged on the substrate side is a reflecting electrode by which light is reflected and an upper surface electrode provided on the side opposite to the substrate is a transparent electrode from which light is picked up to the outside. In this embodiment, the lower surface electrode is an anode and the upper surface electrode is a cathode.

In the light-emitting device of this embodiment of the present invention, the electrode 11 to serve as an anode desirably has high reflectivity and a large work function. For example, chromium (Cr), gold (Au), silver (Ag), or an alloy thereof can be used for the electrode.

In the light-emitting device of this embodiment of the present invention, a material to be used for the electrode 15 to serve as a cathode desirably has high transmittance. For example, an indium tin oxide (ITO), an indium oxide-zinc oxide amorphous transparent conductive film (IZO), or a composite thereof can be used for the electrode.

An organic compound layer of the present invention containing a phenanthroline compound and a carbonate has optically good transmittance. Therefore, the organic compound layer does not prevent the pickup of light from a transparent cathode arranged to be in contact with the organic compound layer, and light can be favorably picked up from the cathode.

Furthermore, the organic compound layer of the present invention is not limited by the work function of the material to be used for the cathode. Therefore, good electron injection to the light-emitting device can be achieved even when a material with a relatively high work function such as ITO or IZO is used for the cathode.

For such a reason, an organic compound layer containing a phenanthroline compound represented by the general formula [I] and a carbonate of the present invention can be preferably used even in a top emissiontype light-emitting device.

In this embodiment, the case where the lower surface electrode is an anode and the upper surface electrode is a cathode has been shown. However, a top emissiontype light-emitting device in which a lower surface electrode is a cathode having a reflection function and an upper surface electrode is an optically transparent anode can be provided by appropriately adapting the laminated structure of the light-emitting device.

EXAMPLES

Hereinafter, preferred examples of the present invention will be described with reference to the drawings. A description is given of the examples by taking cesium carbonate as an example of a carbonate. However, lithium carbonate is also applicable, that is, the present invention is not limited to this example.

Example 1

FIG. 2 shows a first example. In the figure, reference numeral 10 denotes a transparent substrate on an anode side; 11, an ITO layer as an anode for hole injection; 12, a hole transporting layer; 13, a light-emitting layer; 14, an organic compound layer; and 15, a cathode.

An indium tin oxide (ITO) film was formed on a transparent substrate 10 to a thickness of 120 nm by the sputtering process to obtain a transparent anode 11. After that, the substrate was subjected to ultrasonic cleaning with acetone and isopropyl alcohol (IPA) sequentially. Then, the substrate was boiled and washed with IPA, and was dried. Furthermore, the substrate was subjected to UV/ozone cleaning.

Subsequently, a film of α-NPD having a hole transporting characteristic represented by the following chemical formula 1 was formed on the substrate after the cleaning to a thickness of 35 nm by a vacuum deposition process by using a vacuum deposition apparatus (manufactured by Shinku Kiko Inc.) to form a hole transporting layer 12.

Chemical Formula 1

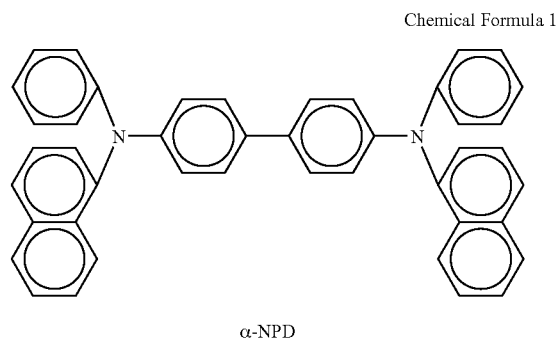

α-NPD

The film formation was performed under conditions upon the deposition of: the degree of vacuum of $1.0 \times 10^{-6}$ Torr; and the film forming rate of 0.2 to 0.3 nm/sec. Then, a film of an aluminum chelate complex (hereinafter, referred to as Alq3) represented by the following chemical formula 2 was formed on the hole transporting layer 12 to a thickness of 15 nm by the vacuum deposition process to form a light-emitting layer 13 under the same conditions as those for the formation of the hole transporting layer 12.

Chemical Formula 2

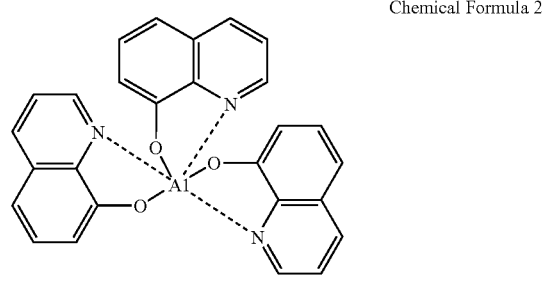

Alq 3

Then, a phenanthroline compound represented by the following chemical formula 3 and cesium carbonate ($Cs_2CO_3$) were deposited as an organic compound layer 14 on the light-emitting layer 13 to a thickness of 35 nm while deposition rates of the phenanthroline compound and cesium carbonate were adjusted in such a manner that the phenanthroline compound and cesium carbonate would be mixed at a thickness ratio of 9:1.

Chemical Formula 3

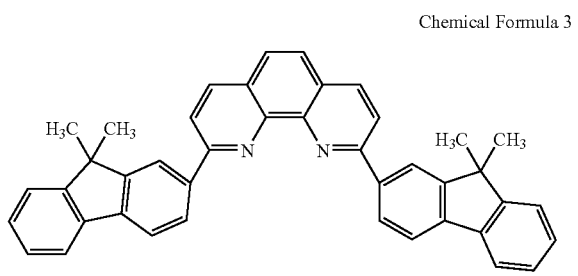

Finally, aluminum (Al) was deposited as a cathode 15 on the organic compound layer 14 to a thickness of 150 nm at a deposition rate of 1 nm/sec.

In this way, the anode 11, the hole transporting layer 12, the light-emitting layer 13, the organic compound layer 14, and the cathode 15 were provided on the transparent substrate 10 to obtain a light-emitting device. Subsequently, a direct voltage was applied to the light-emitting device with ITO as the anode 11 and aluminum as the cathode 15 to check the device for emission characteristic.

Figure 3:
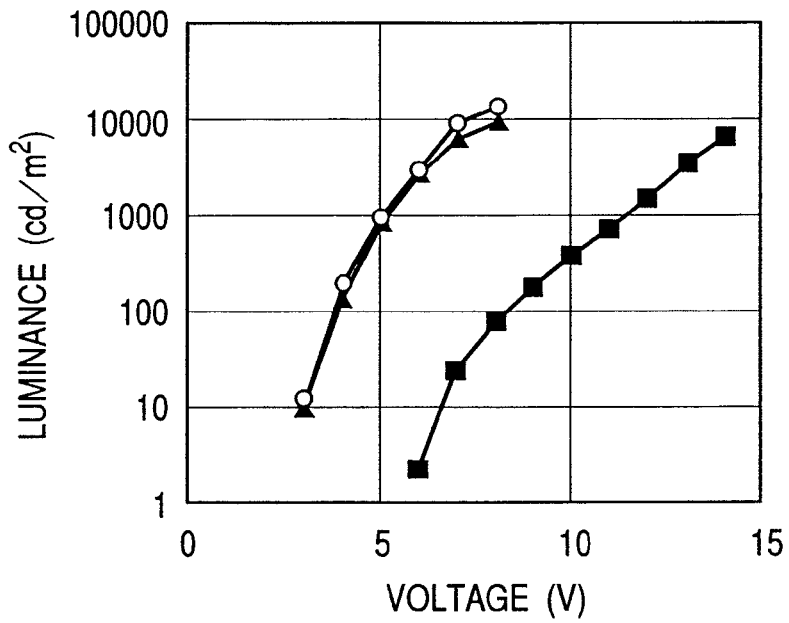
FIG. 3 is a diagram showing voltage-luminance characteristics of Example 1, Comparative Example 1, and Comparative Example 2 of the present invention.

As a result, the device exhibited the maximum luminance of 13,665 cd/m$^2$ and a current density of 1,494 mA/cm$^2$ at an applied voltage of 8 V. In addition, the device exhibited an emission efficiency of 1.011 m/w at an applied voltage of 5 V. FIG. 3 shows the voltage-luminance characteristic at this time.

Furthermore, the relationship between the attenuation change of the initial luminance and an elapsed time was investigated with the current density of an electric current flowing through the device kept at 100 mA/cm$^2$. Table 1 shows the results. Table 1 shows the elapsed time required for the initial luminance to attenuate by a predetermined ratio. Table 1 shows that the time required for the initial luminance of the light-emitting device of Example 1 to attenuate to half is 206 hours.

TABLE 1

|  | Attenuation Time (Hours) | | | |
| --- | --- | --- | --- | --- |
|  | 20% | 30% | 40% | 50% |
| Example 1 | 17 | 51 | 109 | 206 |
| Comparative Example 1 | 3.5 | 28 | 76 | 128 |
| Comparative Example 2 | 0.5 | 2 | 13 | 55 |

Comparative Example 1

This comparative example is an example in which the organic compound to be used for the organic compound layer was changed from the phenanthroline compound of the present invention to bathophenanthroline that had been used in the conventional example for comparison and consideration.

Under the same conditions as those of Example 1, a film of α-NPD was formed as a hole transporting layer 12 on ITO as an anode 11 to a thickness of 35 nm, and a film of Alq3 was formed as a light-emitting layer 13 on the hole transporting layer 12 to a thickness of 15 nm. Then, a phenanthroline compound represented by the following chemical formula 4 and cesium carbonate ($Cs_2CO_3$) were deposited as an organic compound layer 14 to a thickness of 35 nm while deposition rates of the phenanthroline compound and cesium carbonate were adjusted in such a manner that the phenanthroline compound and cesium carbonate would be mixed at a thickness ratio of 9:1.

Chemical Formula 4

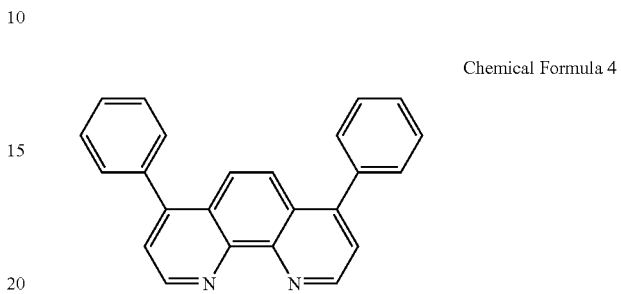

Finally, aluminum (Al) was deposited as a cathode 15 on the organic compound layer 14 to a thickness of 150 nm at a deposition rate of 1 nm/sec.

In this way, the anode 11, the hole transporting layer 12, the light-emitting layer 13, the organic compound layer 14, and the cathode 15 were provided on the transparent substrate 10 to obtain a light-emitting device. Subsequently, a direct voltage was applied to the light-emitting device with ITO as the anode 11 and aluminum as the cathode 15 to check the device for emission characteristic.

As a result, the device exhibited the maximum luminance of 9,833 cd/m$^2$ and a current density of 1,428 mA/cm$^2$ at an applied voltage of 8 V. FIG. 3 shows the voltage-luminance characteristic at this time. In addition, the device exhibited an emission efficiency of 0.77 lm/w at an applied voltage of 5 V.

Furthermore, the relationship between the attenuation change of the initial luminance and an elapsed time was investigated with the current density of an electric current flowing through the device kept at 100 mA/cm$^2$. Table 1 shows the results. Table 1 shows that the time required for the initial luminance of the light-emitting device of Comparative Example 1 to attenuate to half is 128 hours.

Comparative Example 2

This comparative example is an example in which the layer adjacent to the cathode was changed from the organic compound of the present invention to Al-LI that had been widely and generally used in the prior art and bathophenanthroline was used as the electron transporting layer for comparison and consideration.

Under the same conditions as those of Example 1, a film of α-NPD was formed as a hole transporting layer 12 on ITO as an anode 11 to a thickness of 35 nm, and a film of Alq3 was formed as a light-emitting layer 13 on the hole transporting layer 12 to a thickness of 15 nm. Then, a film of a phenanthroline compound was formed to a thickness of 35 nm. A film of Al—Li was formed on the phenanthroline compound film to a thickness of 12 nm. Finally, aluminum (Al) was deposited as a cathode 15 on the Al—Li film to a thickness of 150 nm at a deposition rate of 1 nm/sec.

A direct voltage was applied to the thus-obtained light-emitting device with ITO as the anode 11 and aluminum as the cathode 15 to check the device for emission characteristic.

As a result, the device exhibited the maximum luminance of 6,437 cd/m² and a current density of 423 mA/cm² at an applied voltage of 14 V. FIG. 3 shows the voltage-luminance characteristic at this time. In addition, the device exhibited an emission efficiency of 0.42 lm/w at an applied voltage of 11 V.

Furthermore, the relationship between the attenuation change of the initial luminance and an elapsed time was investigated with the current density of an electric current flowing through the device kept at 100 mA/cm². Table 1 shows the results. Table 1 shows that the time required for the initial luminance of the light-emitting device of Comparative Example 2 to attenuate to half is 55 hours.

Comparison between the voltage-luminance characteristics of Example 1 and Comparative Example 2 shown in FIG. 3 shows that the light-emitting device of the present invention described in Example 1 with the organic compound layer containing a phenanthroline compound and a carbonate has emission characteristics equal to or better than those of the device of Comparative Example 1 and better than those of the device of Comparative Example 2. In addition, comparison among elapsed times required for the attenuation of the initial luminance (Table 1) shows that, under constant conditions, the device of the present invention including the organic compound layer requires a prolonged time for the brightness attenuation and shows an improvement in the durability (service life) of the device as compared to the light-emitting devices of Comparative Example 1 and Comparative Example 2. The phenanthroline compound used in Example 1 has a glass transition temperature (Tg) of about 140° C. and bathophenanthroline used in Comparative Example 2 and Comparative Example 3 has a glass transition temperature (Tg) of about 75° C.

The inventors of the present invention conjecture that an increase in glass transition temperature of such a compound to be used for the organic compound layer exerts not a little influence on an improvement in the durability of the device.

As a result, it becomes possible to provide a light-emitting device with good durability as well as emission characteristics equal to or better than those of a light-emitting device according to the prior art.

Example 2

This example shows an application example to a light-emitting device in which chromium (Cr) that functions as a reflecting electrode is employed as an anode and an indium tin oxide (ITO) that functions as a light-pickup electrode is employed as a cathode, that is, a top emissiontype device.

Figure 4:
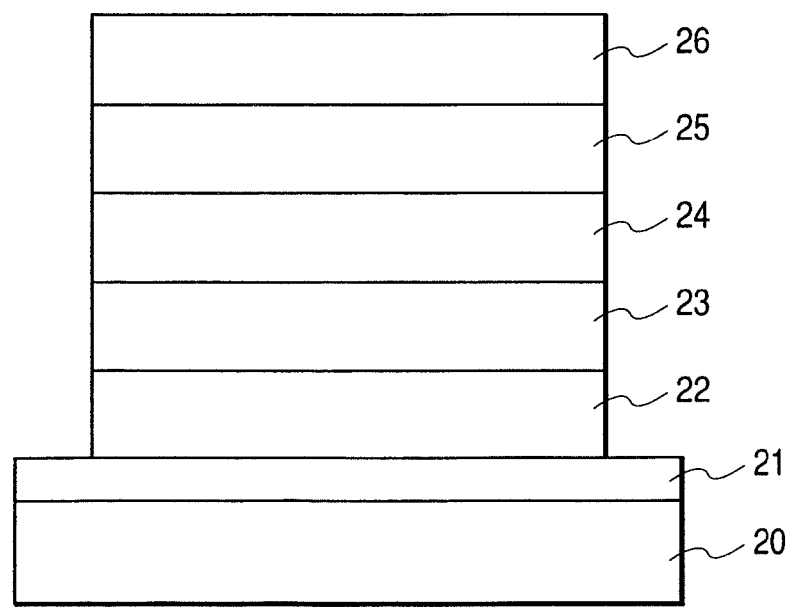
FIG. 4 is a schematic diagram showing an example of a laminated structure of a light-emitting device according to a second example of the present invention.

FIG. 4 shows a second example. In the figure, reference numeral 20 denotes a substrate on an anode side; 21, chromium (Cr) serving as an anode for hole injection and as a reflecting electrode; 22, hole transporting layer; 23, a light-emitting layer; 24, an electron transporting layer; 25, an organic compound layer; and 26, ITO as a transparent electrode for light pickup.

A chromium (Cr) film was formed on a substrate 20 to a thickness of 200 nm by the sputtering process to obtain an anode 21. After that, the substrate was subjected to UV/ozone cleaning. Subsequently, under the same conditions as those of Example 1, a film of α-NPD was formed as a hole transporting layer 22 on the chromium (Cr) serving as the anode 21 to a thickness of 50 nm, and a co-deposited film of coumarin 6 (1.0 wt %) represented by the following chemical formula 5 and Alq3 was formed as a light-emitting layer 23 on the hole transporting layer 22 to a thickness of 30 nm.

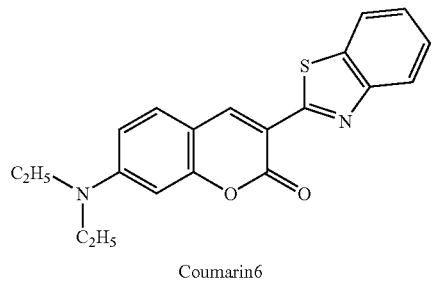

Chemical Formula 5

Coumarin6

Next, a film of the phenanthroline compound represented by the chemical formula 3 was formed as an electron transporting layer 24 to a thickness of 10 nm. Then, the phenanthroline compound represented by the chemical formula 3 and cesium carbonate ($Cs_2CO_3$) were deposited as an organic compound layer 25 to a thickness of 40 nm while deposition rates of the phenanthroline compound and cesium carbonate were adjusted in such a manner that the phenanthroline compound and cesium carbonate would be mixed at a thickness ratio of 9:1. Subsequently, the substrate on which the organic compound layer 25 had been formed was moved to another sputtering system (manufactured by Osaka Vacuum Ltd.). Then, an indium tin oxide (ITO) film was formed on the organic compound layer 25 to a thickness of 150 nm by the sputtering process to obtain a transparent light-pickup cathode 26.

In this way, the anode 21, the hole transporting layer 22, the light-emitting layer 23, the electron transporting layer 24, the organic compound layer 25, and the cathode 26 were provided on the substrate 20 to obtain a light-emitting device. In this example, the electron injection layer 24 has a function as a hole blocking layer as well.

Figure 5:
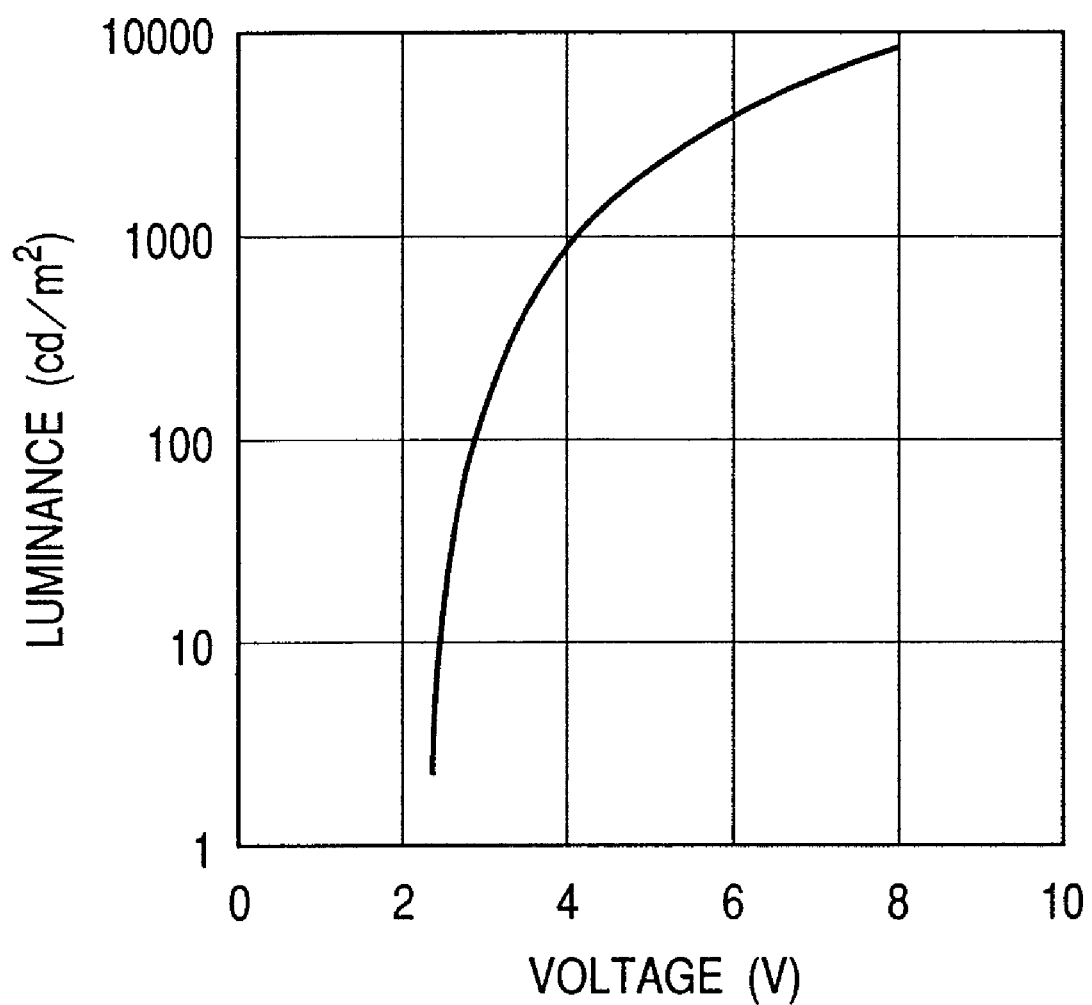
FIG. 5 is a diagram showing a voltage-luminance characteristic of Example 2 of the present invention.

Subsequently, a direct voltage was applied to the light-emitting device with chromium as the anode 21 and ITO as the cathode 26 to check the device for emission characteristic. As a result, the device exhibited the maximum luminance of 8,591 cd/m² and a current density of 112 mA/cm² at an applied voltage of 8 V. In addition, the device exhibited an emission efficiency of 7.4 lm/w at an applied voltage of 3 V. FIG. 5 shows the voltage-luminance characteristic at this time.

Investigation of the durability of the device confirmed that the same thickness constitution has improved durability as compared to the conventional device in which bathophenanthroline is used for the electron transporting layer 24 and the organic compound layer 25. This is considered to be due to a difference in glass transition temperature of compounds. In addition, at this time, no significant differences were found in emission characteristics such as voltage-luminance and efficiency.

As described above, the organic compound layer of the present invention containing a phenanthroline compound represented by the general formula [I] and a carbonate can also be suitably applied to a top emissiontype device. Furthermore, the top emissiontype device has emission characteristics equal to or better than those of the conventional device that uses bathophenanthroline and improved durability as compared to that of the conventional device. As a result, it becomes possible to provide a top emissiontype device with good emission characteristics and high reliability.

As described above by way of embodiments and examples, the light-emitting device of the present invention including an organic compound layer containing a phenanthroline compound represented by the general formula [I] and a carbonate can emit light with high luminance and high efficiency, and is excellent in durability. Thus, it becomes possible to provide a bottom emission or top emissiontype device with good emission characteristics and high reliability.

The invention claimed is:

1. A process for producing a light-emitting device comprising an anode, a cathode, a light-emitting layer arranged between the anode and the cathode, and an organic compound layer contacting the cathode, which comprises:
   a light-emitting layer forming step of forming the light-emitting layer, and
   an organic compound layer forming step of forming the organic compound layer,
   wherein the organic compound layer contains at least one phenanthroline compound represented by the following general formula [1], and
   wherein the organic compound layer forming step comprises a step of forming the organic compound layer under a condition where a carbonate of an alkali metal or an alkaline earth metal is heated,

[1]

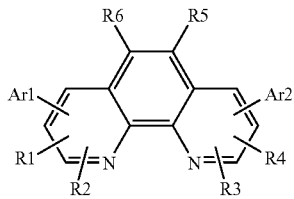

In the formula, R1, R2, R3, R4, R5, and R6 each represent a hydrogen atom, an alkyl group, a substituted or unsubstituted aralkyl group, a substituted or unsubstituted aryl group, a substituted or unsubstituted heterocyclic group, or a halogen atom, R1, R2, R3, R4, R5, and R6 may be identical to or different from one another, Ar1 and Ar2 each represent a substituted or unsubstituted condensed polycyclic aromatic or condensed polyheterocyclic group, and Ar1 and Ar2 may be identical to or different from each other.

2. The process according to claim 1, wherein the carbonate comprises cesium carbonate.

3. The process according to claim 1, wherein the organic compound layer forming step comprises a step of forming the organic compound layer by conducting co-deposition of the phenanthroline compound represented by the general formula [I] and the carbonate of an alkali metal or an alkali earth metal.

* * * * *